United States Patent [19]

Needham

[11] Patent Number: 4,641,677
[45] Date of Patent: Feb. 10, 1987

[54] COAXIAL OPERATING ROD AND PACKING SEAL FOR TOP-OPERATED, BOTTOM OUTLET VALVE IN RAILWAY TANK CAR AND METHOD OF ALIGNING SAME

[75] Inventor: Robert F. Needham, St. Charles County, Mo.

[73] Assignee: ACF Industries, Incorporated, Earth City, Mo.

[21] Appl. No.: 832,728

[22] Filed: Feb. 25, 1986

[51] Int. Cl.$^4$ .................. F16K 43/00; F16K 51/00
[52] U.S. Cl. .................................. 137/15; 137/315; 251/144; 251/293; 251/367
[58] Field of Search ............... 137/347, 350, 15, 315; 251/144, 214, 291, 293, 367

[56] References Cited

U.S. PATENT DOCUMENTS

| 1,513,606 | 10/1924 | Kreamer | 137/347 |
| 3,598,361 | 8/1971 | Crowe | 251/292 |
| 4,313,591 | 2/1982 | Wempe et al. | 251/291 |

FOREIGN PATENT DOCUMENTS 2220732 10/1974 France ........................ 251/293

*Primary Examiner*—A. Michael Chambers
*Attorney, Agent, or Firm*—Polster, Polster and Lucchesi

[57] ABSTRACT

A top-operated, outside unloading device for a bottom discharge railway tank car is disclosed. The tank car has an outlet valve in its bottom which is opened and closed by an operating rod connected to the valve and which extends up through the interior of the tank car. The operating rod projects out through the top of the tank car and is rotated by means of a hand wheel. The upper end of the operating rod is sealed with respect to the tank car by compressible packing seals carried by a packing body surrounding the upper end of the operating rod. The packing body has a part-spherical lower end which mates with a seat surrounding the opening in the top of the tank car through which the operating rod extends. The packing body may universally, angularly (or swivel) move with respect to the seat within a cone of movement so that any misalignment (within a limited range) of the operating rod from the valve at the bottom of the car to the top opening may be accommodated, and so that the packing seals within the packing body may be concentrically aligned with the operating rod thereby to assure proper sealing of the rod to the packing body. After alignment of the packing body with respect to the operating rod, the packing body is sealably secured (preferably welded) to the tank car. A method of aligning and sealing the operating rod relative to the tank car is also disclosed.

8 Claims, 3 Drawing Figures

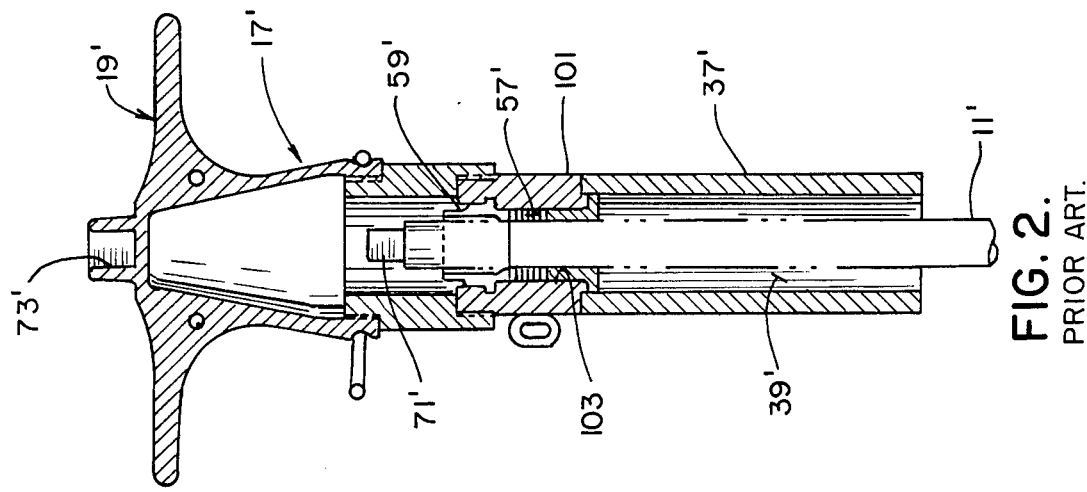
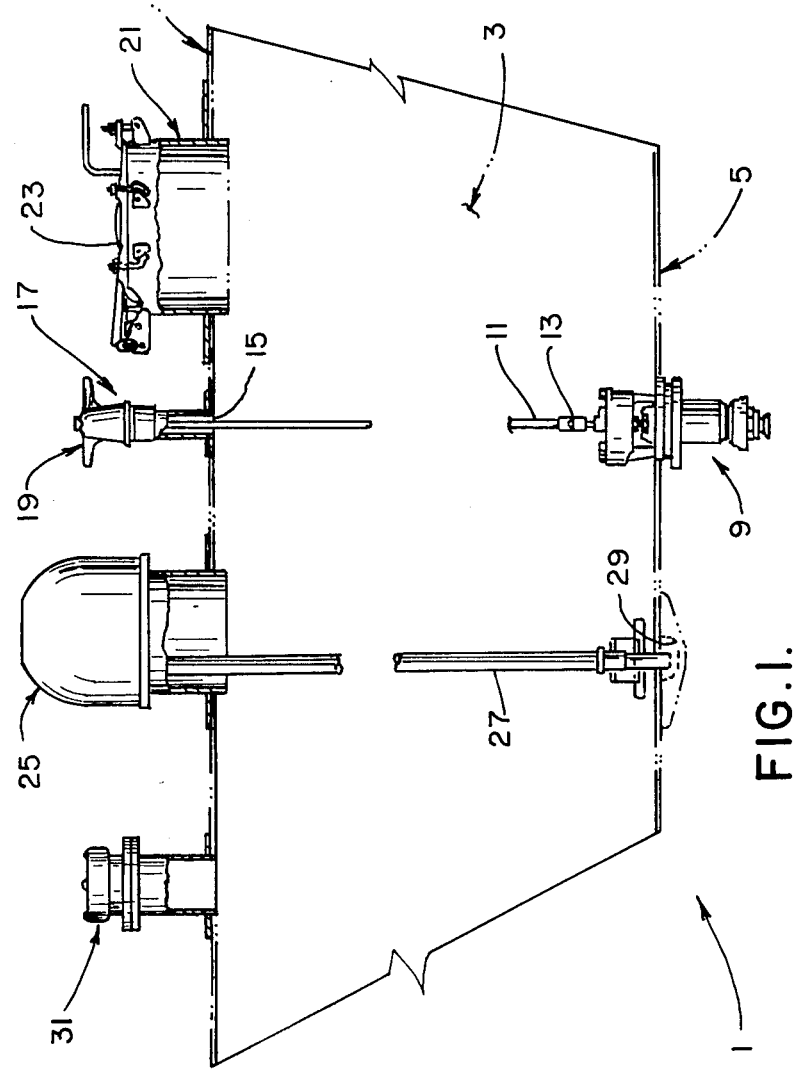
FIG. 2. PRIOR ART.
FIG. 1.

COAXIAL OPERATING ROD AND PACKING SEAL FOR TOP-OPERATED, BOTTOM OUTLET VALVE IN RAILWAY TANK CAR AND METHOD OF ALIGNING SAME

BACKGROUND OF THE INVENTION

This invention relates to railway tank cars, and more particularly to such tank cars which utilize a discharge valve located in the bottom of the tank car, with the discharge valve being selectively opened and closed by an outside unloading device or nozzle located on the top of the car above the bottom valve. Typically, the outside unloading device is operated by an attendant standing on a platform mounted on the top of the car.

More specifically, the outlet valve located in the car bottom may be any of a variety of known types of valves. Generally, however, these bottom mounted discharge valves operated by an outside unloading device requires rotation of a valve member in one direction or the other about a generally vertical axis so as to effect opening and closing of the valve. The valve member in the valve is connected to the outside unloading device located on the top of the car by means of an operating rod secured to the valve member, typically by a U-joint swivel connection, and extends vertically from the valve within the interior of the tank car and passes through an opening in the top of the tank car where the operating rod is rotatably sealed with respect to the tank car so as to permit rotation of the operating rod and the valve member, but so as to prevent leakage of the fluid lading carried by the tank car. As is shown in FIG. 2 of the drawings of the instant specification, prior art outside unloading devices typically included a length of pipe or a sleeve in communication with an opening in the tank car directly above the bottom mounted outlet valve. The operating rod or shaft extended upwardly through this sleeve and was sealed relative to the sleeve by means of a conventional packing seal carried by a packing box on the upper end of the sleeve. The upper end of the operating rod was typically of square or hexagonal cross section so that an operating wrench or handle may be applied thereto, thereby to enable an attendant standing on a platform (not shown in FIG. 1) to readily turn the operating rod so as to open or close the bottom outlet valve, as desired.

While the above-described prior art arrangement for outside unloading devices has worked well for a long period of time, certain long-standing problems have nevertheless existed. First, it will be appreciated that the length of the operating rod from its connection with the bottom outlet valve to the packing seals is rather long. For example, a typical interior diameter for a general service bottom slope tank car may be about 109.6 inches (2.78 m.). Additionally, such tank cars are often insulated so that the above-noted sleeve must extend upwardly from the exterior of the tank car through the insulation blanket and through the insulation shroud or shell. Even though the lower end of the operating rod is connected to the valve above the bottom of the tank car, the distance from the lower end of the connecting rod to the packing seals may typically be about 9–10 feet (2.7–3.1 m.).

It will be further appreciated that during fabrication of the car, due to possible mismeasurements of the opening in the bottom of the car for receiving the outlet valve and of the placement of the opening in the top of the car for the outside unloading device, and due to welding distortions and other distortions of the tank car body, as may be experienced during stress relieving operations, the axis of the packing seals may not be centrically aligned with the axis of the bottom mounted valve. Generally, the adequacy of the packing seal relative to the shaft was highly dependent on the alignment achieved between the bore of the packing housing or box and the operating rod. Such misalignments between the outlet valve and the packing box have resulted in leakage around the operating shaft and the packing material.

SUMMARY OF THE INVENTION

Among the several objects and features of this invention may be noted the provision of an outside loading device which accommodates a relatively wide range of angular misalignment between a bottom mounted outlet valve and the opening in the top of the tank through which an operating seal passes such that packing seals sealing the upper end of the operating rod are substantially concentric with the operating shaft, even when substantial amounts of misalignment between the bottom valve and the top opening of the tank are present;

The provision of such an outside unloading device in which the packing sealing the operating rod may be easily changed from the outside of the tank car without the necessity of removing the operating rod;

The provision of such an outside unloading device which may be retrofitted to tank cars having an outlet unloading device nozzle, as illustrated in FIG. 2; and The provision of such an outside unloading device which is of rugged construction, which has a long service life, and which minimizes leakage of railway tank cars equipped with this outside unloading device.

Other objects and features of this invention will be in part apparent and in part pointed out hereinafter.

Briefly stated, this invention relates to a tank, such as a railway tank car, has a valve located at the bottom thereof which is selectively movable between a closed and an opened position. A valve operating rod is operatively connected to the valve, and extends through at least a portion of the interior of the tank. The tank has an opening through which the operating rod extends. Means for sealing the operating rod relative to the tank is provided. A seat is provided which surrounds this opening. A packing body is provided which has a lower part-spherical surface, and which further has a central packing bore extending therethrough for receiving a portion of the operating rod. The packing bore receives packing material which constitutes the above-noted means for sealing the operating rod relatively to the packing body. The part-spherical surface of the packing body mates with the seat for permitting universal angular (or swiveling) movement of the packing body relative to the seat within a limited range (e.g., within a cone of alignment) thereby to permit the packing bore of the packing body to be aligned with the operating rod such that the packing bore and operating rod are substantially coaxial. Further, means is provided for securing the packing body with respect to the seat after the packing body has been so substantially coaxially aligned with the operating rod.

Alternatively, this invention relates to an outside unloading device or nozzle for a railway tank car, the latter comprising a generally horizontal tank having a bottom and a top. A valve is provided in the bottom of the tank which is selectively movable between a closed and an open position for unloading the tank car when the valve is in its opened position. An operating rod is operatively connected to the valve, and the operating rod extends upwardly within the tank car to the top thereof. The tank has an opening in the top thereof generally above the valve, with the operating rod extending through this opening and out beyond the top of the tank. A seat surrounds this opening. A packing body is provided having a lower part-spherical surface and a central packing bore therethrough. The packing bore receives a portion of the operating rod, and packing material for sealing the operating rod relative to the packing body and for permitting movement of the operating rod from the outside of the tank so as to effect opening and closing of the valve. The part-spherical surface of the packing body mates with the seat for permitting universal angular movement of the packing body relative to the seat within a limited range so that the packing body may be substantially coaxially aligned with the operating rod. Means is provided for securing the packing body to the seat after the packing body has been coaxially aligned with the operating rod.

Further, this invention relates to a method of aligning the packing body relative to the operating rod so that the packing body central bore and the operating rod are substantially coaxial. The packing body is then sealingly secured to the tank or to the seat.

BRIEF DESCRIPTION OF THE DRAWINGS

FIG. 1 is a partial vertical cross section of a tank, such as the tank body of a railway tank car (shown in phantom), having an outside unloading device or nozzle of the present invention installed thereon for selectively opening and closing a valve located in the bottom of the tank by a train attendant standing on a platform (not shown) at the top of the tank car;

FIG. 2 is an enlarged vertical cross section of a prior art outside unloading device nozzle mounted on the top of a railway tank car.

Corresponding reference characters indicate corresponding parts throughout the several views of the drawings.

DESCRIPTION OF PREFERRED EMBODIMENTS

Figure 3:
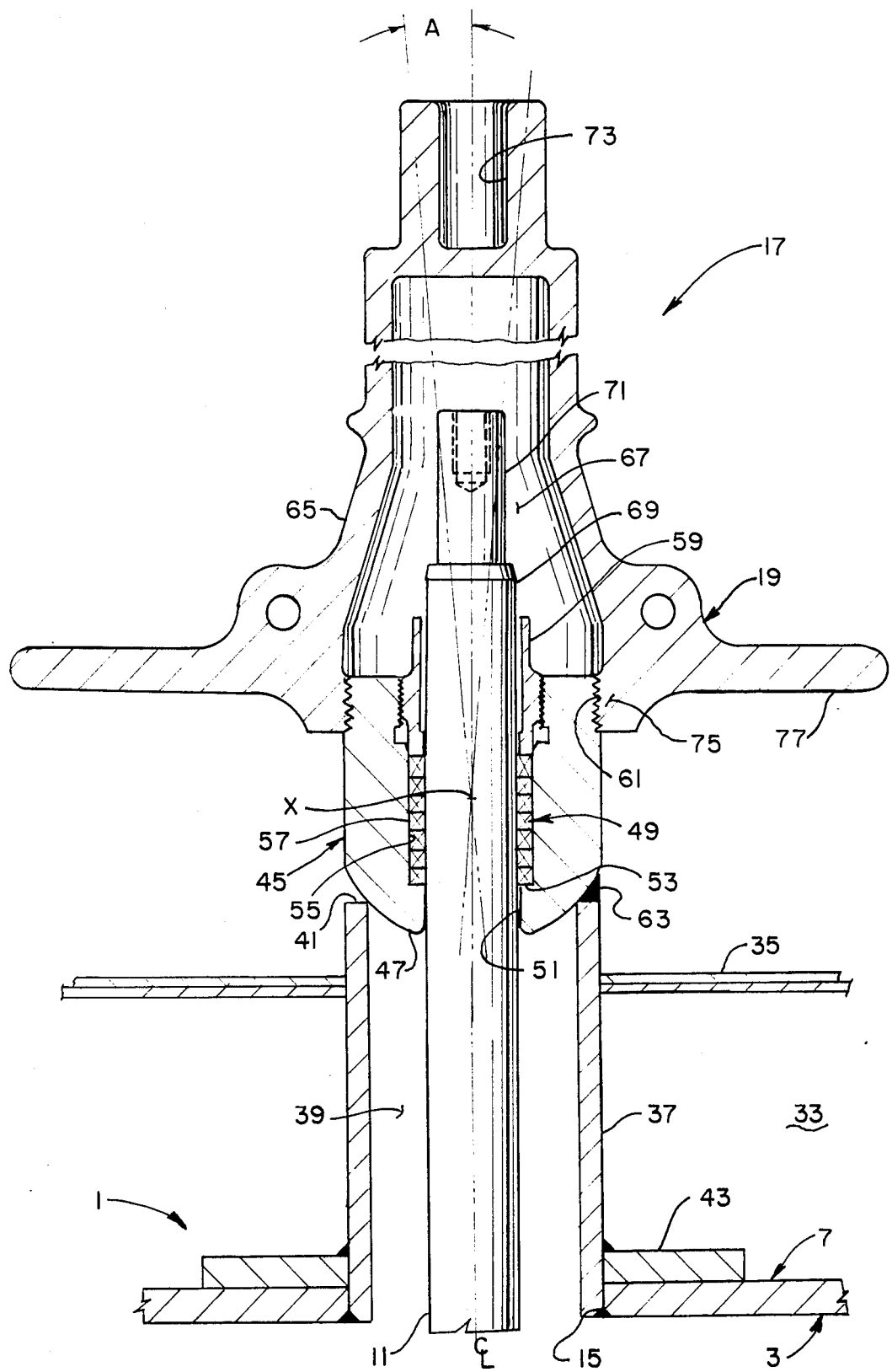
FIG. 3 is an enlarged vertical cross sectional view of an outside unloading device of the present invention, illustrating a packing body in substantial coaxial alignment with the operating rod.

Referring now to the drawings, and particularly to FIG. 1, a portion of a railway tank car, as generally indicated by reference character 1, is illustrated. The railway tank car 1 includes a generally horizontal tank 3 having a bottom 5 and a top 7. The railway tank car is provided with a bottom outlet valve, as generally indicated at 9, which may be selectively moved between an opened and a closed position so that when the bottom outlet valve 9 is opened, a fluid lading within tank car 1 may be off-loaded from the bottom of the car in a conventional manner well known to those skilled in the railway art. Valve 9 may be selectively operated between its opened and closed positions from the top of the car by a train attendant standing on a platform (not shown) mounted on the top of the car. The valve member within valve 9 is operatively connected to an operating rod 11 via a universal swivel joint 13, with the operating rod 11 extending generally vertically within tank 3 from the bottom valve 9 through an opening 15 in the top of the tank to an outside unloading device or nozzle, as generally indicated at 17, located on the top of the tank car. Opening 15 is disposed in the top 7 of tank 3 generally above the axis of rotation of the operating member of valve 9. Outside unloading device 17 is equipped with a combination cover/handle 19 which, when in its installed position as shown in FIGS. 1–3, overlies and covers the upper or operating end of operating rod 11, and which (as described in greater detail hereinafter), when unscrewed from its structure and inverted and when a socket in its upper end is applied to the uppermost end of operating rod 11, constitutes a wrench or hand wheel allowing a train attendant to selectively open and close bottom valve 9 by rotating operating valve rod 11 and valve 9 from above.

As further shown in FIG. 1, it is conventional for a railway tank car to include a manway opening, as generally indicated at 21, which is sealingly closed by a manway cover 23. Additionally, tank cars often include an eductor 25, including an inductor or siphon pipe 27 and a sump 29 for unloading the fluid lading of the tank car 1 from above. A safety vent valve 31 may also be provided on the tank car.

Referring now to FIG. 3, the outside unloading device or nozzle 17 of the present invention is shown in greater detail. Generally, tank car 1, as illustrated in FIG. 3, is an insulated tank car having an insulation space 33 disposed between tank 3 and an outer insulation cover or jacket 35. For clarity, thermal insulation within insulation space 33 has been omitted. A tubular sleeve 37 is fitted into opening 15 in the top of tank 3, and the sleeve 37 extends upwardly from the top of the tank through a corresponding opening in insulation jacket 35. The tubular sleeve has a sleeve opening 39 therethrough which is of substantially larger cross section than the cross section of operating rod 11. The top end of the sleeve, as indicated at 41, constitutes a seat for purposes as will appear. As indicated at 43, a tank reinforcing ring surrounds opening 15 in tank 3 such that sleeve 37, reinforcing ring 43, and tank 3 are welded to one another in the region of opening 15 so as to form a sealed opening in the tank.

In accordance with this invention, outside unloading device 17 includes a packing body or box, as generally indicated at 45, having a lower part-spherical surface 47 and a central packing bore 49 extending therethrough. The bottom end of packing bore 49 is relatively narrow, as indicated at 51, so as to be only slightly larger in diameter or cross section than the cross section of operating rod 11 which extends therethrough. In this manner, opening 51 serves as a gauge opening which substantially centers packing bore 49 of packing body 45 with respect to the operating rod 11. It will be understood, however, that there is sufficient clearance between the narrow portion 51 of packing bore 49 and the operating rod such that operating rod 11 may be moved either rotationally or in axial direction with respect to the packing body without interference. A shoulder 53 is provided within packing bore 49 and the region of the packing bore above shoulder 53 defines a packing receiving section 55. As indicated at 57, a plurality (e.g., seven) of packing rings 57 are stacked one on top of the other within packing section 55, with the bottom-most packing ring bearing against shoulder 53. These packing rings have an inner opening extending therethrough which sealingly engages the outer surface of operating rod 11 extending through the packing bore of the packing body. Those skilled in the art will recognize that packing rings may be made of any conventional packing material, such as a chevron-molded synthetic resin (PTFE) ring, an asbestos/PTFE braid, or an all-PTFE braid. A packing gland 59 is threadably inserted into the upper end of packing bore 59 such that the packing gland may be threaded inwardly toward shoulder 53 for substantially uniformly compressing packing rings 57 thereby to ensure a leak-tight seal between the outer surface of operating rod 11 and packing body 45. As indicated at 61, external threads are provided on the upper end of packing body 45.

In accordance with this invention, and more particularly in accordance with the method of this invention, packing body 45, when first installed on seat 41 of sleeve 37, is free to move in universal angular direction about point X (i.e., to swivel), with the part-spherical surface 47 of the packing body bearing on seat 41 so that the axis of operating shaft 11 and the axis of central bore 49 of packing body 41 may be aligned so as to be substantially coaxial with respect to one another. As indicated, packing body 45 is free to move or swivel about any angular axis relative to point X within a limited range, as indicated by angle A, so as to accommodate a variety of angular misalignments of operating rod 11 relative to seat 41 such that even with a relatively large degree of angular misalignment between the operating rod and the axis of sleeve 37, packing body 45 can still be in substantial coaxial alignment with the operating rod. This ensures that packing rings 57, when compressed by packing gland 59, are uniformly compressed against both the outer surface of operating rod 11 and against the enlarged surface of the central packing bore 49 defining packing section 55, thereby to ensure that the packing rings 57 effectively seal the operating rod with respect to the packing body.

Further in accordance with this invention, after operating rod 11 has been installed on valve 9 so as to extend upwardly through the interior of tank 3 through opening 15 and upwardly through opening 39 of sleeve 37, packing body 45 may be installed onto the upper end of the operating rod so as to assume a position, as generally shown in FIG. 3. In this manner, the relatively close tolerances between the bottom portion 51 of central bore 49 of packing body 45 ensures that the packing bore 49 of packing body 45 is substantially coaxial with respect to the operating rod. Further, the part-spherical surface 47 bearing on seat 41 contacts the seat uniformly around the circumference of seat 41, and thus accommodates misalignment of the operating rod with respect to the axis of opening 39 in sleeve 37 to a degree generally as indicated by a cone of rotation having its apex at point X, as indicated by angle A. With packing body 45 so installed on the upper end of operating shaft 45, and with the part-spherical surface 47 in engagement with seat 41, the packing body is then sealably secured with respect to seat 41 so as to fixedly hold packing body 45 in place relative to seat 41, and so as to seal the packing body with respect to the seat. As indicated in FIG. 3, the preferred means of securing the packing body to the seat 41 is to weld the packing body to the upper end of sleeve 37. However, those skilled in the art will recognize that there may be other means for sealably securing the packing body to the seat. Within the broader aspects of this invention, those skilled in the art will appreciate that sleeve 37 may be omitted in the event insulation 33 and insulation jacket 35 is not required. For example, the appropriate size opening 15 in tank 3 (and in reinforcement ring 43) may serve directly as a seat opening engageable with part-spherical surface 47 on packing body 45.

In this manner and in accordance with this invention, it has been found that in a railway tank car having a distance of about 10 feet between the upper end of the bottom outlet valve 9 and packing body 45, a misalignment between the vertical axis of opening 15 in the top of tank 3 and the axis of rotation of outlet valve 7 as much as three inches may be accommodated without operating valve 11 binding on sleeve 37, and with the operating rod being substantially coaxial with respect to packing bore 49. As will be appreciated, this greatly facilitates fabrication of railway tank cars inasmuch as significantly more forgiving tolerances may be maintained between the centerline of opening 15 and the center of bottom outlet valve 9 while maintaining substantial concentricity between the upper end of the operating rod and packing bore 49 of packing body 45, thereby ensuring a uniform sealing of the packing rings.

Handle/cover 19 is shown to include a body 65 having a chamber 67 therewithin for accommodating the upper end 69 of operating rod 11. The uppermost end 71 of operating rod 11 is preferably of either square or other polygonal cross section. A corresponding socket 73 is provided in the upper end of body 65. Internal threads 75 are provided on body 65 which are threadably engageable with threads 61 on the upper end of packing body 45 so that the cover/handle 19 may be threaded onto the packing body in the manner shown in FIG. 3 so that the upper end of the packing body and the upper end 71 of the operating rod are covered. Likewise, by unscrewing body. 65 from packing body 45, the combination cover/handle 19 may be removed from the packing body so as to expose the upper end 71 of the operating rod. With the cover/handle so removed from the packing body, the train attendant may invert the cover/handle assembly and apply socket 73 to the upper end 71 of the operating rod. By turning handle wheel 77 in one direction or the other, a train attendant may selectively effect rotation of operating rod 11 in one direction or the other so as to selectively open or close bottom outlet valve 9.

Referring to FIG. 2, a prior art outside unloading device, as has been long used in general railway service by ACF Industries, Incorporated, the assignee of the present invention, is shown. Corresponding "primed" reference numbers indicate parts having a corresponding structure and function to those parts heretofore described in regard to FIG. 3. It will be appreciated, however, in FIG. 2 that a packing body 101 is rigidly secured (welded) to the upper end of sleeve 37 such that the packing bore 103 of packing body 101 is substantially coaxial with respect to the opening 39' in sleeve 37. In this manner, with the axis of operating rod 11' being out of exact concentric alignment with the axis of packing bore 103, a binding force was applied to the operating rod and to packing rings 57 within packing body 101. In the past, this would result in unsymmetrical compression of the packing rings which could lead to leakage past the packing rings.

In accordance with the present invention, those skilled in the art will appreciate that sleeve 37' of prior art outside unloading device 17', as shown in FIG. 2, can be modified for the retrofit installation of the outside unloading device 17 of the present invention, as shown in FIG. 3. This retrofit installation may be accomplished by cutting off sleeve 37' in the area immediately below packing body 101 such that the upper surface of sleeve 37' serves as a seat for part-spherical surface 47 of packing body 45. The latter is then installed in the manner as heretofore described.

In view of the above, it will be seen that the other objects of this invention are achieved and other advantageous results obtained.

As various changes could be made in the above constructions or method without departing from the scope of the invention, it is intended that all matter contained in the above description or shown in the accompanying drawing shall be interpreted as illustrative and not in a limiting sense.

What is claimed is:

1. The method of installing an outside unloading device for a railway tank car, the latter comprising a tank, a valve in the tank, said valve being selectively movable between an opened and a closed position which when opened permits unloading of the tank car, an operating rod operatively connected to said valve and extending within said tank, said tank having an opening therethrough, and a seat surrounding said opening, wherein the method comprises the steps of:

attaching said operating rod to said valve member in the tank, said rod generally within the tank and out through said tank opening;

installing a packing body having a central bore therethrough and a part-spherical surface on the end of said operating rod extending through said opening out beyond said tank, with the packing body bore and the operating rod being substantially centered relative to one another;

mating said part-spherical surface of said packing body with said seat in such manner as to permit universal angular swiveling movement of said packing body with respect to said seat such that with said operating rod received within said packing body bore, said packing body bore and said operating rod are substantially coaxial with respect to one another; and sealably securing said packing body with respect to said seat after said packing body has been so coaxial aligned with said operating rod, and after said packing body has been mated to said seat.

2. The method of claim 1 wherein said step of securing said packing body to said seat comprises welding said packing body to said seat.

3. In a bottom outlet tank, such as a railway tank car, having a valve in the bottom of the tank selectively movable between an opened and a closed position, a valve rod operatively connected to said valve extending through at least a portion of the interior of the tank and projecting out beyond the tank, and means for sealing said operating rod relative to the tank proximate the location on the tank at which said operating rod passes through said tank, wherein the improvement comprises: said tank having an opening therethrough through which said operating rod extends, a seat surrounding said opening, a packing body having a lower part-spherical surface and a central packing bore for receiving a portion of said operating rod, said packing bore receiving packing means constituting said means for sealing said operating rod relative to said packing body, said packing body part-spherical surface mating with said seat for permitting universal angular swiveling movement of said packing body relative to said seat within a limited range with respect to said seat such that said packing bore is substantially coaxial with respect to said operating rod, and means for securing said packing body with respect to said seat after said packing body has been coaxially aligned with said operating rod.

4. In a bottom outlet tank as set forth in claim 3 wherein said packing body securing means comprises said packing body being welded to said seat.

5. In a bottom outlet tank as set forth in claim 3 wherein said tank opening for said operating rod is substantially opposite from said valve.

6. In a bottom outlet tank as set forth in claim 3 wherein said tank has a sleeve extending outwardly from said tank, said sleeve having an outer end constituting said seat and a sleeve opening in register with said tank opening for receiving said operating rod.

7. In a bottom outlet tank as set forth in claim 3 wherein said valve is rotatable between its opened and closed positions, said operating rod being rotatable from outside said tank so as to effect the opening and closing of said valve, said packing means sealably engaging said operating rod and permitting rotation thereof.

8. An outside unloading device for a railway tank car, the latter comprising a generally horizontal tank, a valve in said tank selectively operable between an opened and a closed position so that with said valve in its opened position said tank car may be unloaded, an operating rod connected to said valve and extending within said tank, said tank having an opening therethrough, said operating rod extending through said opening out beyond said tank, a seat surrounding said opening, a packing body having a rounded surface and a central packing bore, said packing bore receiving a portion of said operating rod, said packing bore further receiving packing means for sealing said operating rod relatively to said packing body and for permitting movement of said operating rod from the outside of said tank car so as to effect the opening and closing of said valve, said packing body rounded surface mating with said seat for permitting universal angular movement of said packing body relative to said seat within a limited range with respect to said seat such that said packing bore is substantially centered with respect to said operating rod, and means for securing said packing body to said seat after said packing body has been so centrally aligned with said operating rod.

* * * * *